B. M. KENT.
LOCKING DEVICE.
APPLICATION FILED JULY 28, 1915.

1,211,451. Patented Jan. 9, 1917.

Inventor
B. M. Kent

Witnesses

UNITED STATES PATENT OFFICE.

BURTON M. KENT, OF SAYRE, PENNSYLVANIA, ASSIGNOR OF ONE-HALF TO EDWARD M. RAGAN, OF BINGHAMTON, NEW YORK.

LOCKING DEVICE.

1,211,451.  Specification of Letters Patent.  Patented Jan. 9, 1917.

Application filed July 28, 1915. Serial No. 42,369.

*To all whom it may concern:*

Be it known that I, BURTON M. KENT, a citizen of the United States, residing at Sayre, in the county of Bradford, State of Pennsylvania, have invented certain new and useful Improvements in Locking Devices; and I do hereby declare the following to be a full, clear, and exact description of the invention, such as will enable others skilled in the art to which it appertains to make and use the same.

The present invention is directed to improvements in locks, and more particularly to locks used in connection with grease cups. In the present instance the lock is shown as used in connection with a grease cup, but it will be understood that the construction is such that it can be used for positively locking relatively movable parts of any kind.

The invention has for its object to provide a lock constructed in such a manner, that the plunger may be positively locked against rotary movement.

A further object of the invention is to provide a lock of this character so constructed that the plunger can be locked positively in any desired position within the cup, and readily unlocked when it is desired to remove the plunger to fill the cup, or to actuate the plunger to force the grease therefrom.

With these and other objects in view, this invention resides in the novel features of construction, formation, combination and arrangement of parts to be hereinafter more fully described, claimed and illustrated in the accompanying drawing, in which:—

Figure 1:
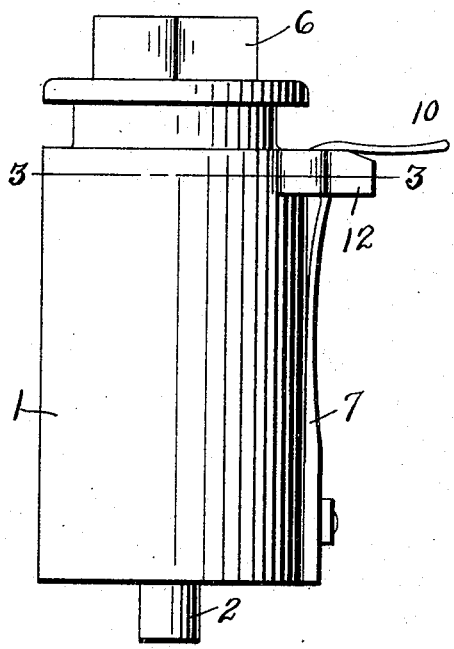
Figure 2:
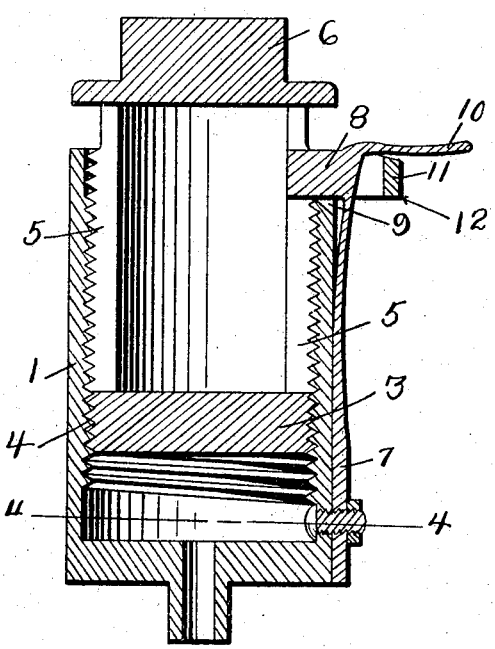
Figure 3:
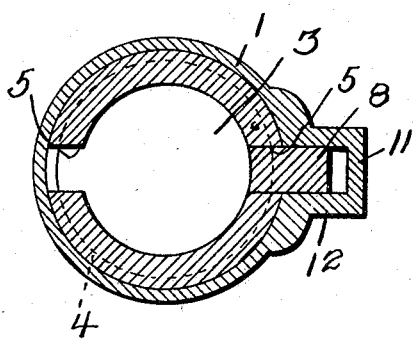
Figure 4:
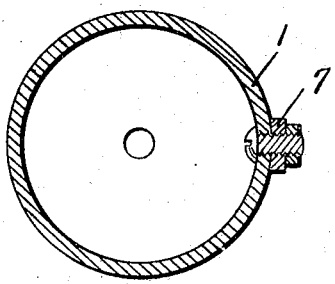

Figure 1 is a side elevation of the device. Fig. 2 is a vertical central sectional view through the device. Fig. 3 is a sectional view on line 3—3 of Fig. 1. Fig. 4 is a similar view on line 4—4 of Fig. 2.

In the present instance the lock is shown as used in connection with a grease cup, and in which 1 indicates the cup, which is cylindrical and has its bottom provided with a nipple 2, and through which the grease is discharged.

The plunger 3 is hollow and exteriorly threaded, as at 4. The plunger 3 is further provided with longitudinal slots 5, two of which being illustrated in the drawing, but it will be of course understood that the number may be varied as desired. The upper end of the plunger is provided with a squared head 6, which is adapted to be engaged by a wrench, or other suitable tool, whereby the plunger may be rotated. The plunger is exteriorly threaded so as to engage the threads formed interiorly of the cup 1.

Bolted to the cup 1 is the lower end of a steel arm 7, the upper end of which is provided with a head 8 which occupies the notch 9 formed in the upper edge of the cup, said head being adapted to engage either one of the slots 5, formed in the plunger so as to prevent rotation thereof. The head 8 is provided with a finger piece 10 which overhangs the horizontal bar 11 of the bracket 12, said bracket being connected to the cup.

When it is desired to adjust the plunger, it is only necessary to place the forefinger under the bracket 12, and the thumb upon the finger-piece 10, whereupon the arm 7 may be flexed outwardly until the head 8 thereof is withdrawn from the selected slot 5. After this is done it is obvious that the plunger may be rotated, as desired. To replace the plunger in the cup, it is only necessary to press the lower end thereof in engagement with the head 8, thus forcing the same outwardly, and since the slots 5 do not extend the entire length of the plunger, the uninterrupted threaded portion of the plunger will engage the interior threads of the cup, which start at a point slightly below the upper edge of the cup.

What is claimed is:—

A device of the class described, comprising a cup interiorly threaded, a plunger exteriorly threaded for threaded engagement in the cup, said plunger having a plurality of longitudinal slots formed therein, a steel arm having its lower end fixed exteriorly of the cup, and its upper end provided with a head adapted to engage a selected slot, a finger piece carried by the head, and a bracket carried by the cup and adapted to be grasped with the finger piece to disengage the head from a selected slot.

In testimony whereof, I affix my signature, in the presence of two witnesses.

BURTON M. KENT.

Witnesses:
  ROBERT A. SUTHERLAND,
  CHARLES F. RAU.